US011883695B2

(12) United States Patent
Plummer et al.

(10) Patent No.: US 11,883,695 B2
(45) **Date of Patent: *Jan. 30, 2024**

(54) RESPIRATOR MASK WITH AIR-SAVER SWITCH

(71) Applicant: SCOTT TECHNOLOGIES, INC., Monroe, NC (US)

(72) Inventors: Darrill L. Plummer, Midland, NC (US); Dustin Carroll Clark, Monroe, NC (US); Judge W. Morgan, III, Oakboro, NC (US)

(73) Assignee: Scott Technologies, Inc., Monroe, NC (US)

( * ) Notice: Subject to any disclaimer, the term of this patent is extended or adjusted under 35 U.S.C. 154(b) by 326 days.

This patent is subject to a terminal disclaimer.

(21) Appl. No.: 17/357,240

(22) Filed: Jun. 24, 2021

(65) Prior Publication Data

US 2021/0316163 A1 Oct. 14, 2021

Related U.S. Application Data

(63) Continuation of application No. 16/065,271, filed as application No. PCT/US2016/068340 on Dec. 22, 2016, now Pat. No. 11,077,323.

(Continued)

(51) Int. Cl.

*A62B 9/02* (2006.01)
*A62B 9/04* (2006.01)

(Continued)

(52) U.S. Cl.

CPC ................ *A62B 9/022* (2013.01); *A62B 9/04* (2013.01); *A62B 18/02* (2013.01); *A62B 18/10* (2013.01)

(58) Field of Classification Search

CPC ........... A62B 9/022; A62B 9/025; A62B 9/04; A62B 18/02; A62B 18/10

See application file for complete search history.

(56) References Cited

U.S. PATENT DOCUMENTS 4,361,145 A 11/1982 Ekstrom
4,572,176 A 2/1986 Walther (Continued)

FOREIGN PATENT DOCUMENTS

CN 104784842 7/2015
DE 2620170 A1 11/1977

(Continued)

OTHER PUBLICATIONS

International Search report for PCT International Application No. PCT/US2016/068340 dated Apr. 14, 2017, 5 pages.

*Primary Examiner* — Kathryn E Ditmer
(74) *Attorney, Agent, or Firm* — Kenneth B. Wood

(57) ABSTRACT

A respirator mask for automatically activating an air-saver switch within a regulator by rotation of the regular as the regulator is mounted and dismounted from a facepiece of the mask. The mask includes a facepiece including a regulator engagement region having an aperture and a protrusion proximate the aperture, and a regulator including a regulator body having a facepiece engagement region mateably engageable with the regulator engagement region, a fluid flow path within the regulator body, and a latch within the regulator body, the latch causing obstruction of the fluid flow path when actuated. The latch is engageable with the protrusion, the regulator being rotatable within the facepiece aperture between a first rotational position and a second rotational position, rotation of the regulator within the facepiece aperture from the second to the first rotational position engaging and actuating the latch to obstruct the fluid flow path.

19 Claims, 8 Drawing Sheets

Related U.S. Application Data

(60) Provisional application No. 62/376,203, filed on Aug. 17, 2016, provisional application No. 62/272,821, filed on Dec. 30, 2015.

(51) Int. Cl.

| | |
|---|---|
| ***A62B 18/02*** | (2006.01) |
| ***A62B 18/10*** | (2006.01) |

(56) References Cited

U.S. PATENT DOCUMENTS

| | | | | | |
|---|---|---|---|---|---|
| 4,693,242 | A | 9/1987 | Biard | | |
| 4,715,371 | A | 12/1987 | Haas | | |
| 5,501,213 | A * | 3/1996 | Jackson | B63C 11/2227 | 128/205.24 |
| 6,651,662 | B2 | 11/2003 | Prete | | |
| 8,336,547 | B1 | 12/2012 | Ritchie | | |
| 8,479,736 | B2 | 7/2013 | Ging | | |
| 2004/0244797 | A1 | 12/2004 | Jackson | | |
| 2004/0261794 | A1 * | 12/2004 | Patterson | A62B 9/022 | 128/204.26 |
| 2011/0011403 | A1 | 1/2011 | Hannah | | |
| 2015/0165245 | A1 | 6/2015 | Townsend | | |

FOREIGN PATENT DOCUMENTS

| | | | | |
|---|---|---|---|---|
| JP | S58-27568 | A | 2/1983 | |
| JP | S58-191055 | U | 12/1983 | |
| RU | 2279902 | | 7/2006 | |
| SU | 1703135 | | 1/1992 | |
| WO | WO 1995/32023 | | 11/1995 | |
| WO | WO-9532023 | A1 * | 11/1995 | A62B 9/025 |
| WO | WO 2015/027390 | | 3/2015 | |
| WO | WO 2015/030493 | | 3/2015 | |

* cited by examiner

RESPIRATOR MASK WITH AIR-SAVER SWITCH

TECHNICAL FIELD

The invention relates to automatically activating an air-saver switch within a respirator mask air regulator.

BACKGROUND

Respirator masks are used in environments where individuals such as first responders are exposed to hazardous materials, such as gases, vapors, smoke, fire, aerosols (e.g., dusts, mists, and/or biological agents), and the like. Respirator masks come in a large variety of types and sizes, ranging from cheaper, disposable masks to higher cost, reusable masks that supply breathable air to a user from a tank or other air source. For example, self-contained breathing apparatus (SCBA) include a mask that supplies breathable air to a user from a tank worn on the user's back. SCBAs are used in a wide variety of different applications, such as, but not limited to, fire-fighting, military applications, diving, hazardous industrial applications, and/or the like.

SCBA's typically include a regulator that is mounted to a facepiece of the mask of the SCBA. Such mask-mounted regulators receive pressurized air from a pressure reducer coupled to an air source such as an air tank. The regulator further regulates the pressure of the air to provide breathable air to the user. Known mask-mounted regulators typically include a configuration, which may be referred to as an "air-saver switch," that stops the flow of air through the regulator when breathable air is not required by the user, such as when the user removes the mask. However, known air-saver switches are manually actuated switches that require the user of the SCBA to press a button on the regulator to stop the flow of breathable air, i.e., activate the air-saver switch.

SUMMARY

The invention advantageously provides a respirator mask for automatically activating an air-saver switch within a regulator by rotation of the regular as the regulator is mounted and dismounted from a facepiece of the respirator mask. In one embodiment, a respirator mask includes a facepiece including a regulator engagement region having an aperture and a protrusion proximate the aperture, and a regulator including a regulator body having a facepiece engagement region mateably engageable with the regulator engagement region, a fluid flow path within the regulator body, and a latch within the regulator body, the latch causing obstruction of the fluid flow path when actuated. At least a portion of the regulator is sized and configured to be received within the facepiece aperture such that the latch is engageable with the protrusion, the regulator being rotatable within the facepiece aperture between a first rotational position and a second rotational position such that rotation of the regulator within the facepiece aperture from the second rotational position to the first rotational position engages and actuates the latch to obstruct the fluid flow path.

In another aspect of this embodiment, the facepiece further includes an interior surface and an exterior surface opposite the interior surface, and the protrusion extends a distance from the facepiece exterior surface. In another aspect, the protrusion includes an apex at which the protrusion extends a maximum distance from the facepiece exterior surface. In another aspect of this embodiment, the protrusion is located at a third rotational position between the first rotational position and the second rotational position, the protrusion includes a latch activation region, and the latch is engaged and actuated by contact with the latch activation region when the regulator is rotated between the first rotational position and the second rotational position.

In another aspect, the third rotational position may be substantially 45° from the first rotational position. In still another aspect of this embodiment, the regulator further includes a diaphragm having a diaphragm valve, the diaphragm valve being linearly movable within the regulator body. In another aspect, the facepiece defines an interior of the mask, an application of a vacuum on the diaphragm from the interior of the mask moving the diaphragm valve toward the facepiece and unobstructing the fluid flow path. In another aspect, the regulator further includes a lever having a first end and a second end opposite the first end, the first end being pivotably coupled to the regulator body and the second end being coupled to the diaphragm valve. In accordance with another aspect, the latch is linearly movable within the regulator body. In another aspect of this embodiment, the latch has a first end and a second end opposite the first end, in which the second end is in contact with and exerting a force against the lever when the first end is in contact with the latch activation region. In another aspect, the latch further has a protrusion engagement element at the first end and the facepiece engagement region may have an aperture, the protrusion engagement element extending through the aperture. In another aspect of this embodiment, the regulator body further has a proximal end and a distal end opposite the proximal end, the facepiece engagement region being at the proximal end. In another aspect, the respirator engagement region further has a locking slot. Further, in another aspect, the latch is within the locking slot when the regulator is in the second rotational position.

In accordance with another embodiment, a regulator for a respirator mask includes a regulator body including a facepiece engagement region, a fluid flow path within the regulator body, a latch movable within the regulator body, the latch including a first end having a protrusion engagement element and a second end opposite the first end, at least a portion of the protrusion engagement element protruding from the facepiece engagement region, a diaphragm having a diaphragm valve linearly movable within the regulator body such that the fluid flow path is obstructed when the diaphragm valve is at a first position and the fluid flow path is obstructed when the diaphragm valve is at a second position, and a lever within the regulator body, the lever including a first end pivotably coupled to the regulator body and a second end coupled to the diaphragm valve, the latch second end engaging and actuating the lever to move the diaphragm valve from the second position to the first position.

In another aspect of this embodiment, the latch is linearly movable along a first axis and the diaphragm valve is linearly movable along a second axis. In another aspect, the latch is movable along a linear distance having an initial location, a final location, and an intermediate location between the initial location and the final location, the latch actuating the lever when the latch is at one of the intermediate location and the final location. In another aspect, the lever includes a lever catch spring that is configured to engage a portion of the regulator body when the lever is in a first position and disengage the portion of the regulator body when the lever is in a second position. In another aspect of this embodiment, the linear movement of the latch toward the starting location and away from the lever causes the lever catch spring to disengage the portion of the regulator body such that an application of a vacuum on the diaphragm will move the diaphragm to a position in which the fluid flow path is unobstructed.

In still another embodiment, a facepiece for a respirator mask includes a first surface, a second surface opposite the first surface, an aperture extending from the first surface to the second surface, and a regulator engagement region, the regulator engagement region including a protrusion on the facepiece second surface proximate the aperture, the protrusion having a latch activation region with a height relative to the facepiece second surface.

BRIEF DESCRIPTION OF THE DRAWINGS

A more complete understanding of the invention, and the attendant advantages and features thereof, will be more readily understood by reference to the following detailed description when considered in conjunction with the accompanying drawings wherein.

DETAILED DESCRIPTION

Figure 1:
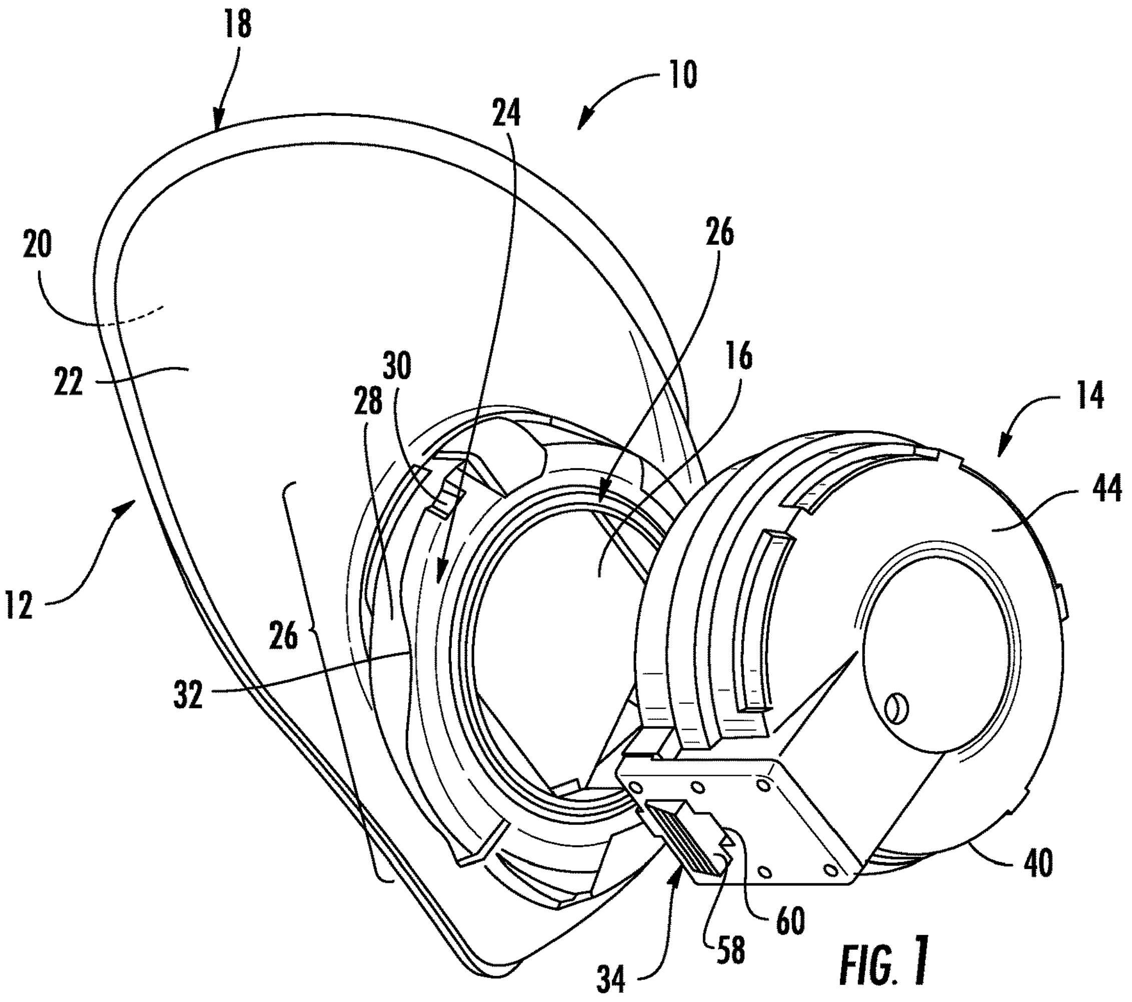
FIG. 1 shows an exploded perspective view of an embodiment of a respirator mask for providing respiratory protection, the respirator mask including a facepiece and a regulator.

The invention advantageously provides a respirator mask that includes a regulator having an air-saver switch that is activated to cut off a supply of fluid, such as air without having to have a user manually actuate a lever, switch, button, etc. In one embodiment the supplied fluid is air, and in another embodiment the air is breathable air. In one embodiment, the air-saver switch automatically activates by rotation of the regulator as the regulator is mounted and dismounted from the facepiece of the mask. This is achieved by the inclusion of a latch engagement area on the facepiece that includes a protrusion. The regulator includes a latch that engages with the protrusion at a certain rotational position during assembly as the regulator is rotated into position on the facepiece. When the latch engages with the protrusion, the latch pushes against a lever within the regulator that moves a diaphragm valve. Movement of the diaphragm valve sets or resets (i.e., activates) the air-saver switch.

Before describing in detail exemplary embodiments that are in accordance with the disclosure, it is noted that components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as “first,” “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures in which like reference designations refer to like elements, an embodiment of a respirator mask constructed in accordance with the principles of the invention is shown in the figures and generally designated as “10.” The respirator mask 10 includes a facepiece 12 and an air regulator 14. As is discussed in more detail below, the regulator 14 may be rotated within an aperture 16 in the facepiece 12 to automatically activate an air-saver switch, thereby cutting off the supply of air from an air tank such as a SCBA air tank.

The mask 10 is configured to be worn by a user, such as first responder, in environments where the user is exposed to hazardous materials, such as fire, smoke, gases, vapors, aerosols, biological agents, and/or the like. Consequently, the facepiece 12 is sized to fit over all or part of a user’s face. As a non-limiting example, the facepiece 12 is sized to cover the user’s eyes, nose, and mouth. Alternatively, the facepiece 12 is sized to cover only the user’s nose and mouth. At least a portion of the facepiece 12 is composed of transparent or translucent materials commonly used for respirator mask facepieces. The facepiece 12 further includes a first or interior surface 20, a second or exterior surface 22 opposite the interior surface 20, and an aperture 16 within the facepiece 12 that is sized and configured to receive at least a portion of the regulator 14. Further, the aperture 16 is round so that the regulator 14 can rotate within the aperture 16. However, it will be understood that the aperture 16 could have any configuration that allows the regulator 14 to rotate within the aperture 16. Further, although the facepiece 12 is shown in the figures as being a single piece, the invention is not limited to such an embodiment, and the facepiece 12 includes several components, including components made from different materials. Further, the features of the face-piece 12 is included on or defined by individual components of the facepiece. As a non-limiting example, a portion of the facepiece disposed over the user's eyes is constructed from a transparent material, wherein a portion of the facepiece that defines the aperture 16 may be constructed from one or more opaque, rigid plastics. If the facepiece 12 includes more than one component, the components may be coupled together during assembly or be manufactured together as an integrated unit. Some components may be customizable for an individual user's face size and shape. For example, the facepiece may be "one-size-fits" all, but the mask 16 may include a rubber nosecup, i.e., oronasal mask, inside the mask 16 that is sized to fit the user. As used herein, the term "facepiece" refers to the facepiece 12 (which may also be referred to as a fenestra), the nosecup, and any intervening components to create the facepiece as a whole.

The facepiece 12 further includes a regulator engagement region 24 proximate the aperture 16. For example, the regulator engagement region 24 at least partially encircles the aperture 16. The regulator engagement region 24 also includes threading or other features proximate the aperture 16 and/or within the aperture 16 that engage at least a portion of the regulator 14 and allow the regulator 14 to be removably coupled to the facepiece 12.

Figure 2:
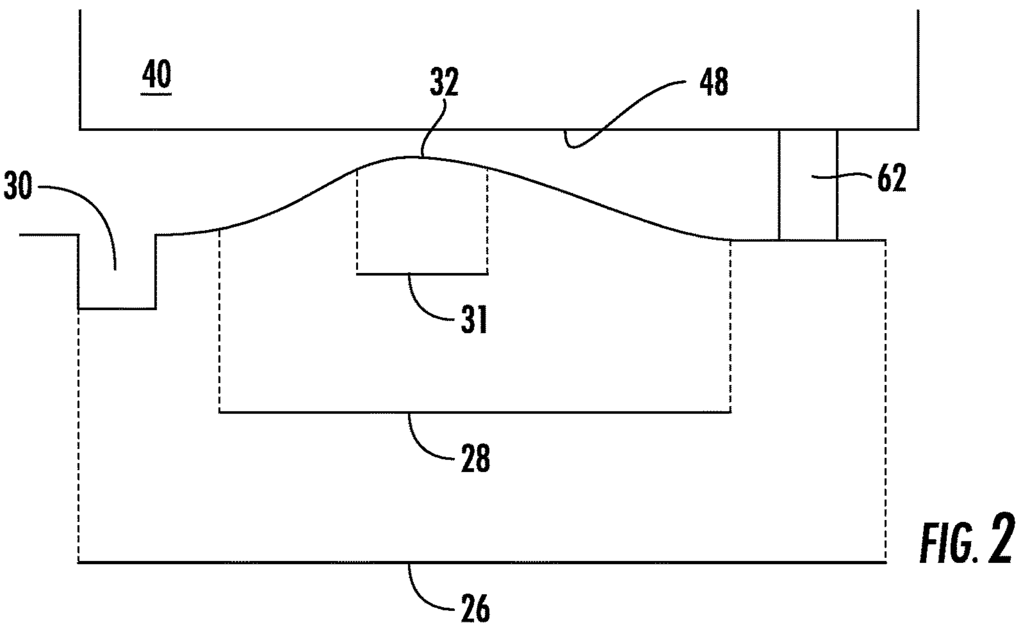
FIG. 2 shows a cross-sectional view of an exemplary latch engagement area on the facepiece and a regulator latch when the regulator is in a first position.
Figure 3:
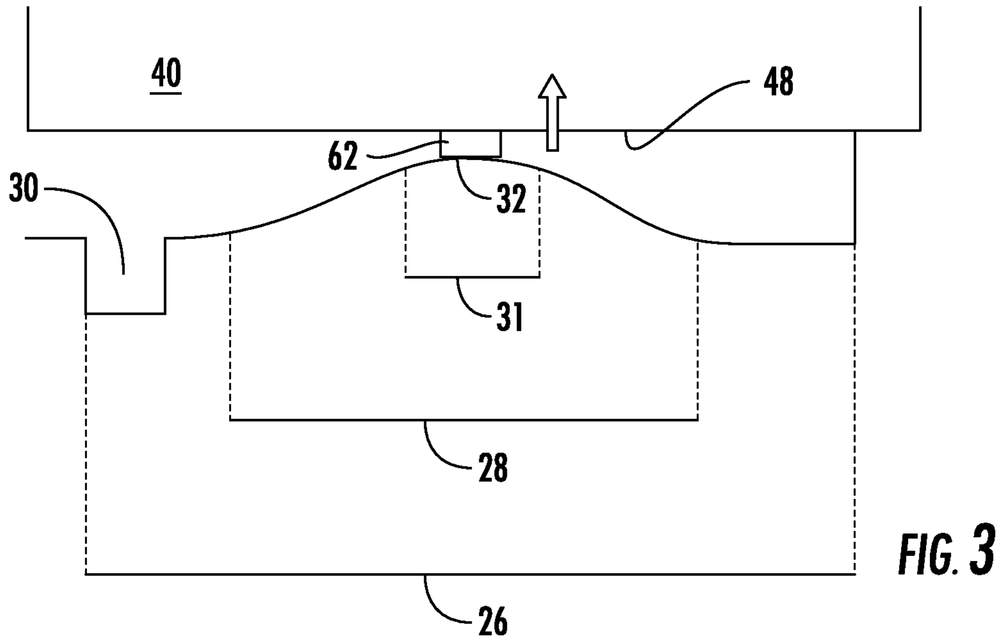
FIG. 3 shows a cross-sectional view of the exemplary latch engagement area on the facepiece and the regulator latch when the regulator is in a second position.
Figure 4:
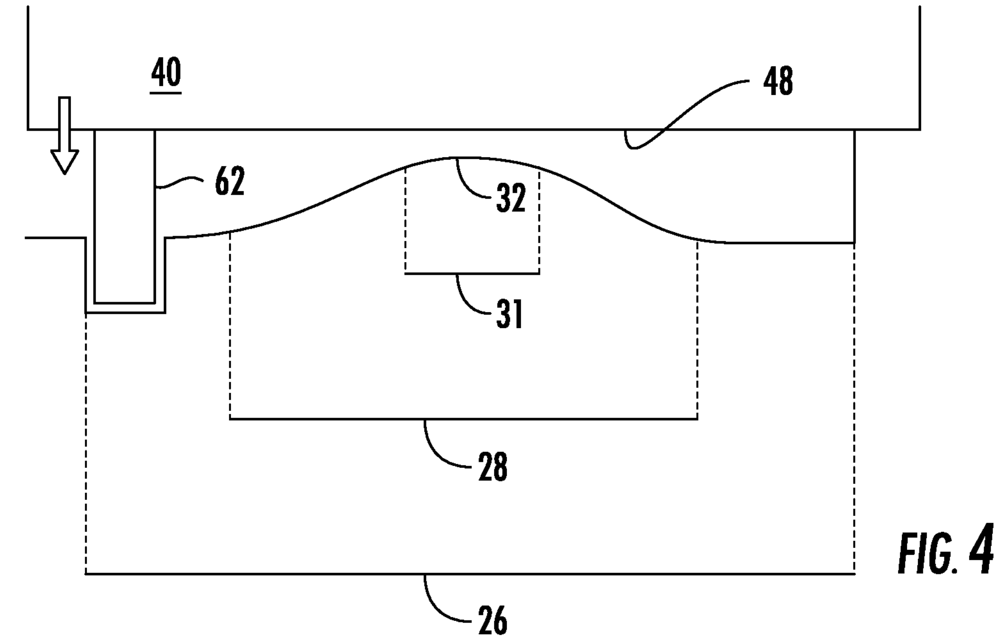
FIG. 4 shows a cross-sectional view of the exemplary latch engagement area on the facepiece and the regulator latch when the regulator is in a third position.
Figure 5:
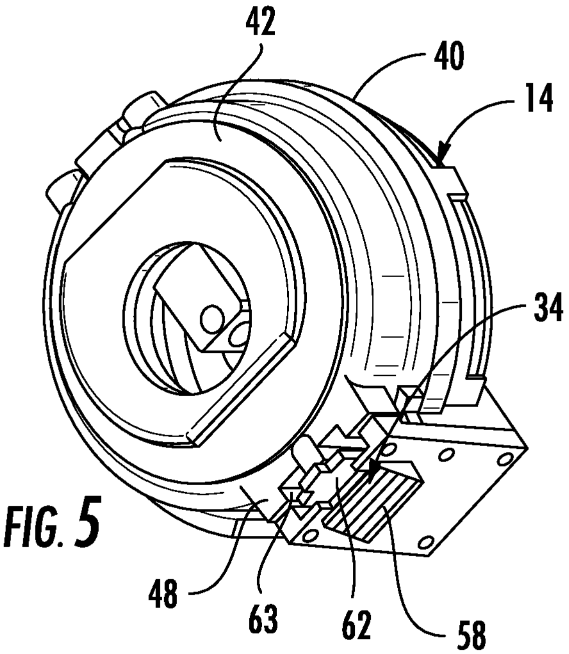
FIG. 5 shows a rear view of the regulator of FIG. 1.

The regulator engagement region 24 also includes a latch engagement area 26 including a protrusion 28 and a locking slot 30 proximate the aperture 16. FIGS. 2-4 are cross-sectional views of an exemplary latch engagement area (for example, as shown in FIG. 1) and latch are shown with the regulator in a first, second, and third rotational position. In FIG. 2, the regulator 14 is at an initial or first rotational position, and the latch 34 is in contact with the latch engagement area 26. In FIG. 4, the regulator 14 is at a second and locked rotational position, and the latch 34 is extended into the locking slot 30. In FIG. 3, the regulator 14 is at a third rotational position between the first and second rotational positions, and the latch 34 is in contact with at least a portion of the protrusion 28 in the latch engagement area 26.

The protrusion 28 is elongate but generally follows a curvature of the aperture 16, such as the curvature of the aperture 16 from a 0° initial position and a locking position, which in one embodiment is rotationally at 90° from the initial position. It is understood that the locking position need not be at 90° and that any rotational position can be used as long as there is sufficient rotation to activate the air saver and lock the regulator 14 to the facepiece 12. In another embodiment, the protrusion 28 may have any con-figuration that allows activation of an air-saver switch within the regulator 14, as discussed in greater detail below.

As a non-limiting example, the protrusion 28 has a height, or plurality of heights, that are close enough to the regulator 14 when the mask 10 is assembled to engage a latch and activate the air-saver switch (for example, as shown in FIG. 3). Further, the protrusion 28 includes a latch activation region 31, which is a distance over which the latch 34 is moved by the protrusion 28 to a distance within the regulator 14 at which the latch 34 activates the air-saver switch. The latch activation region 31 includes an apex 32 at which the protrusion 28 has a maximum height; however, it will be understood that the air-saver switch may be activated by the latch when the latch in contact with the latch activation region 31, and not necessarily the apex 32. For example, the air-saver switch may be activated by movement of the latch 34 when the latch 34 is in contact with the latch activation region 31 on the facepiece 12 at a location that is to the right or left of the apex 32 shown in FIGS. 2-4. Further, the protrusion 28 may be at any location on the facepiece 12 at which a portion of a latch 34 on the regulator 14 is engaged. For example, the protrusion 28 may be on the facepiece exterior surface 22 proximate the aperture 16 (as shown in FIG. 1), on the facepiece interior surface 20 proximate the aperture 16, and/or within the aperture 16, such as on an inner circumferential edge of the aperture 16. Additionally, the protrusion 28 extends from a portion of the facepiece 12 that is raised from the interior 20 or exterior 22 surface of the facepiece 12.

The regulator 14 generally includes a regulator body or housing 40 having a proximal end 42 and a distal end 44, from a user's perspective when the mask 10 is assembled and donned. The regulator body 40 defines or includes a fluid flow path through which a fluid flows from an external source and into an interior 46 of the mask 10. As a non-limiting example, the regulator may be in fluid communi-cation with a source of pressurized air (not shown) such as from an air tank, and the pressurized air may flow through the fluid flow path within the regulator 14 and into the mask interior 46 when the mask is worn by a user and the supply of air from the air source is unobstructed.

As is shown in FIGS. 1 and 3, the regulator 14 further includes a facepiece engagement region 48 at the regulator body proximal end 42 that is mateably engageable with the regulator engagement region 24. The regulator further includes a latch 34 that is linearly movable within the regulator body 40. The regulator 14 fits within the aperture 16 such that a portion of the latch 34 is in contact with and slides or moves over the protrusion 28 as the regulator 14 is rotated such as from an uninstalled position to an installed position and vice versa. As the latch 34 passes over the protrusion 28, the decreased distance between the facepiece 12 and the regulator 14 at the protrusion 28 moves the latch 34 within the regulator to activate the air-saver switch.

As shown in the cross-sectional views of FIGS. 6, 11, 14, and 15, the latch 34 includes a first end 54, a second end 56, and a manual actuator 58 at a location between the first 54 and second 56 ends. The manual actuator 58 extends through an aperture 60 in the regulator body 40 and movement of the manual actuator 58 linearly moves the latch 34. The first end 54 includes a protrusion engagement element 62 that pro-trudes through an aperture 63 in the facepiece engagement region 28 of the regulator body 40, depending on the location of the latch 34 along a linear distance.

For example, the linear distance over which the latch 34 is movable includes a first or initial location and a second or final location. When the latch 34 is at the first or initial position, the protrusion engagement element 62 protrudes from the portion of the facepiece engagement region 48 of the regulator 14 that is in contact with the facepiece when the mask 10 is assembled. When the latch 34 is in at the second or final location, the protrusion engagement element 62 may not protrude from the portion of the facepiece engagement region 48 of the regulator 14 that is in contact with the facepiece when the mask 10 is assembled. Contact between the latch 34 and the latch activation region 31 first occurs when the latch 34 is at a third or intermediate location that is between the first or initial location and the second or final location. In other words, the latch activates the air-saver switch when the latch 34 is at the intermediate location before the latch 34 reaches the final location. However, the latch also activates the air-saver switch when the latch 34 is at the final location.

The regulator 14 further includes a spring 64 that biases the latch 34 toward a first position in which the protrusion engagement element 62 protrudes from the regulator body 40 toward the latch engagement area 26 when the regulator is being mounted to the facepiece 12. The protrusion engagement element 62 may have any size and configuration that allows it to contact the protrusion 28. The protrusion 28 is shown on the facepiece exterior surface 22 in the figures, and the protrusion engagement element 62 is configured accordingly. However, if the protrusion is on the facepiece interior surface 20 proximate the aperture 16, the protrusion engagement element 62 may have a hook or L-shape such that it extends through the aperture 16 and contacts the facepiece interior surface 20. Similarly, if the protrusion 28 is on an edge of the aperture 16, the protrusion engagement element 62 may protrude from a lateral surface of the regulator body 40, rather than from the proximal end 42, such that the protrusion engagement element 62 is in contact with the protrusion 28 when the mask is assembled.

The regulator 14 further includes an "air-saver switch" that is activated to prevent the flow of fluid through the fluid flow path of the regulator 14, thereby preventing the unwanted flow of the fluid, e.g., the pressurized air, from the fluid supply. The air-saver switch includes a number of components that work together to obstruct or unobstruct the fluid flow path. For example, in one embodiment the air-saver switch, i.e., the mechanism to prevent fluid flow, includes a lever 66, a diaphragm valve 70. A demand valve (not shown) is in a fluidly serial arrangement with the fluid supply and is used to allow or prevent the fluid flow into the regulator. In operation, the demand valve is modulated by the movement of a diaphragm 68 and the diaphragm valve 70 such that breathing moves the diaphragm 68 and the diaphragm valve 70 which it turn modulates the demand valve to allow the passage of fluid through the regulator.

Figure 14:
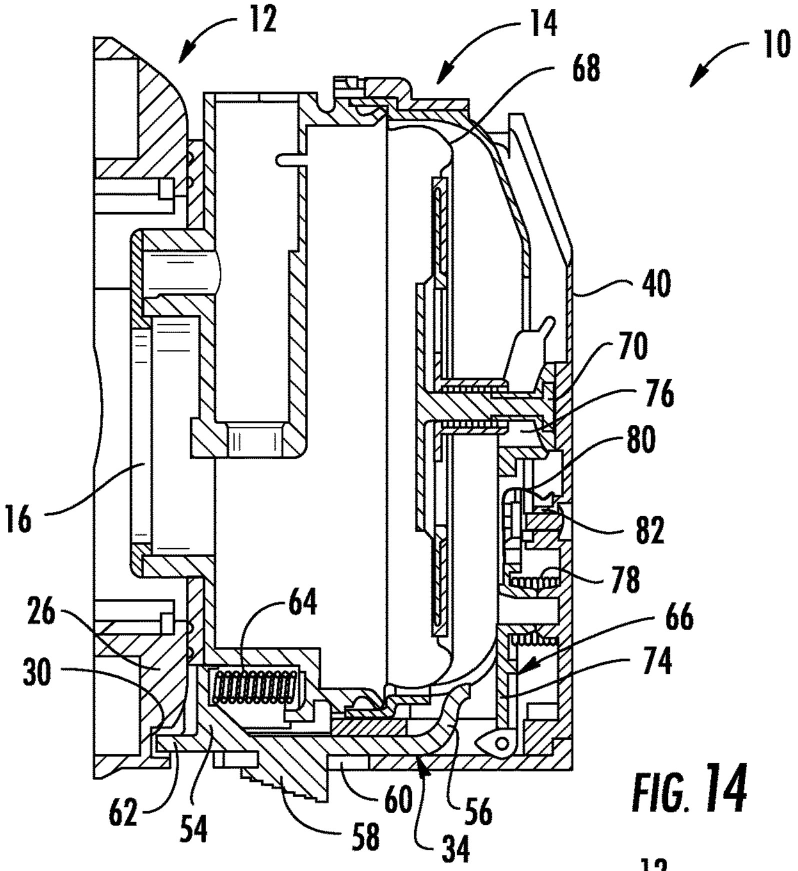
FIG. 14 shows a cross-sectional view of the regulator and a portion of the facepiece taken through section 14-14 of FIG. 12, the regulator being in the third rotational position and a fluid flow path being obstructed.
Figure 15:
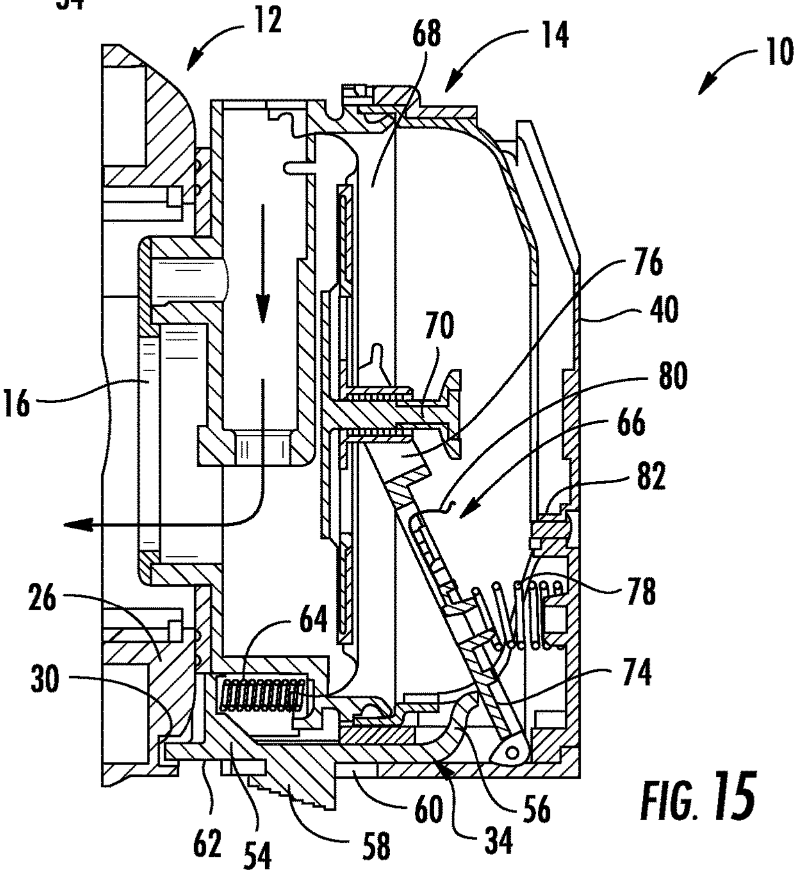
FIG. 15 shows a cross-sectional view of the regulator and a portion of the facepiece, the regulator being n the third rotational position and the fluid flow path being unobstructed.

The diaphragm valve 70 is linearly movable within the regulator body 40. In one embodiment, the diaphragm valve 70 may be movable along an axis of movement over a linear distance that is parallel to an axis of movement over a linear distance along which the latch 34 is movable, although it will be understood that the diaphragm valve axis and the latch axis need not be parallel. Further, movement of the lever 66 as shown in FIG. 14 holds the diaphragm valve 70 toward the distal end 44 of the facepiece, thereby holding the demand valve in the closed position, i.e., the flow of fluid is obstructed In other words, when the air saver switch is activated, i.e., set or reset, the lever 66 is locked into a position the holds the diaphragm valve 70 in a position that causes the demand valve to stay in a closed position.

The lever 66 has a first end 74 that is pivotably coupled to the regulator body 40 and a second end 76 that is pivotably coupled to the diaphragm valve 70. The lever 66 further is coupled to a coiled spring 78 that is also coupled to the regulator body 40. Further, the lever 66 includes a lever catch spring 80 that is received within a notch 82 in the regulator body 40 when the lever 66 is in a first position. The air-saver switch is considered to be activated, or in the on position, when the lever 66 and the diaphragm valve 70 are in the first position (shown in FIG. 14). When the air-saver switch is activated, the fluid flow path is obstructed. Likewise, the air-saver switch is considered to be deactivated, or in the off position, when the lever 66 and the diaphragm valve 70 are in the second position. When the air-saver switch is deactivated, the fluid flow path is unobstructed and fluid may freely flow to the interior of the mask (shown in FIG. 15). When the demand valve is activated, and the air-saver switch is therefore deactivated, fluid may freely flow through the demand valve to the user.

Referring now to FIGS. 6-15, the fluid flow path is automatically obstructed, that is, the air-saver switch activated, by rotation of the regulator 14 within the aperture 16 between a first or initial position at 0° and a second or locking position that is a predetermined rotational distance, e.g., 90°, from the initial position. As a non-limiting example, the regulator 14 may be rotated from the 0° position to the 90° position in a counterclockwise direction, from the user's perspective when the mask 10 is worn by the user. This rotation is shown as being in a clockwise direction in the figures that show the front view of the mask 10. Generally, automatic activation of the air-saver switch is accomplished by linear movement of the latch against the lever 66 of the air-saver switch within the regulator body 40 as the latch protrusion engagement element 62 passes over the protrusion 28. As the regulator 14 is rotated to mount the regulator 14 to the facepiece 12, the protrusion engagement element 62 moves along the protrusion 28 toward the apex 32. As the protrusion engagement element 62 approaches the apex 32, the lever second end 76 comes into contact with, and eventually exerts a force against, the lever 66. The force against the lever 66 urges the lever 66 to an upright position, which pulls the diaphragm valve 70 toward the regulator body distal end 44. As a result, the air-saver switch becomes activated.

Figure 6:
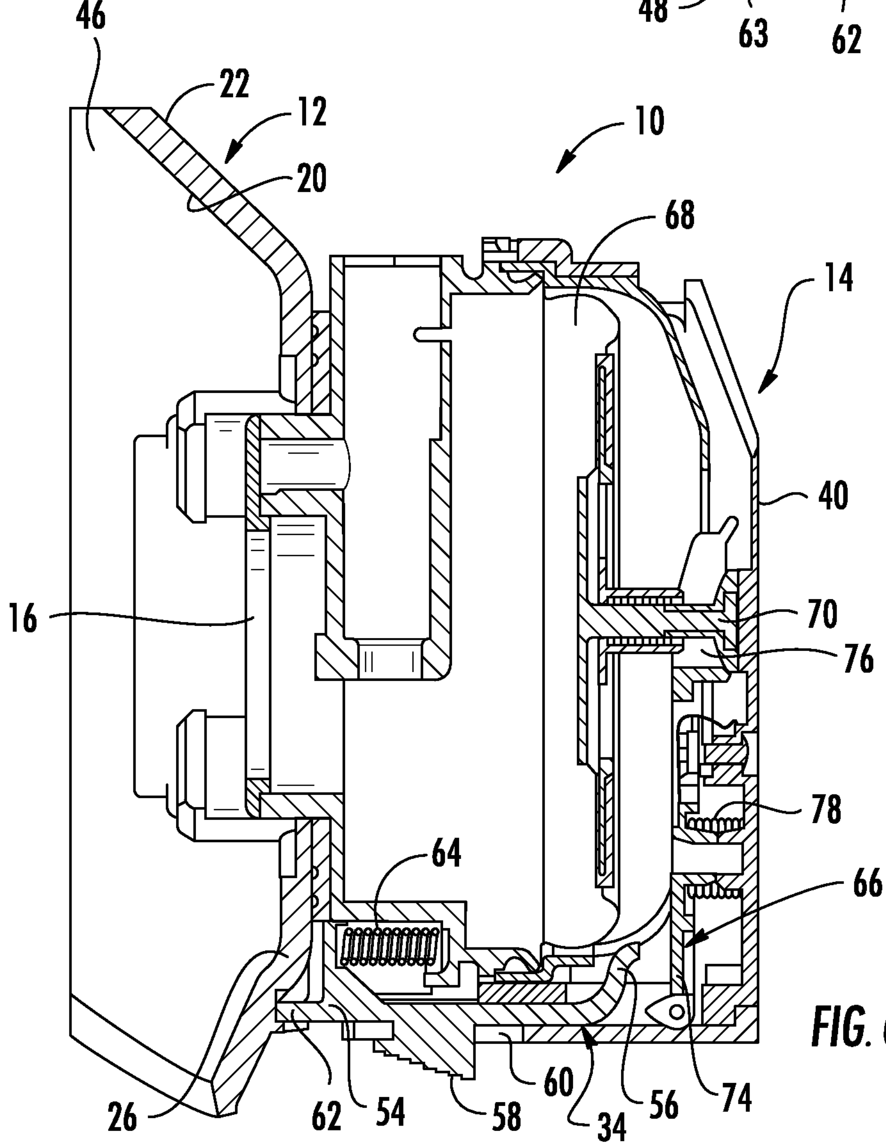
FIG. 6 shows a cross-sectional view of the regulator and a portion of the facepiece of FIG. 1 taken through section 6-6 of FIG. 7, the regulator being in a first rotational position.
Figure 7:
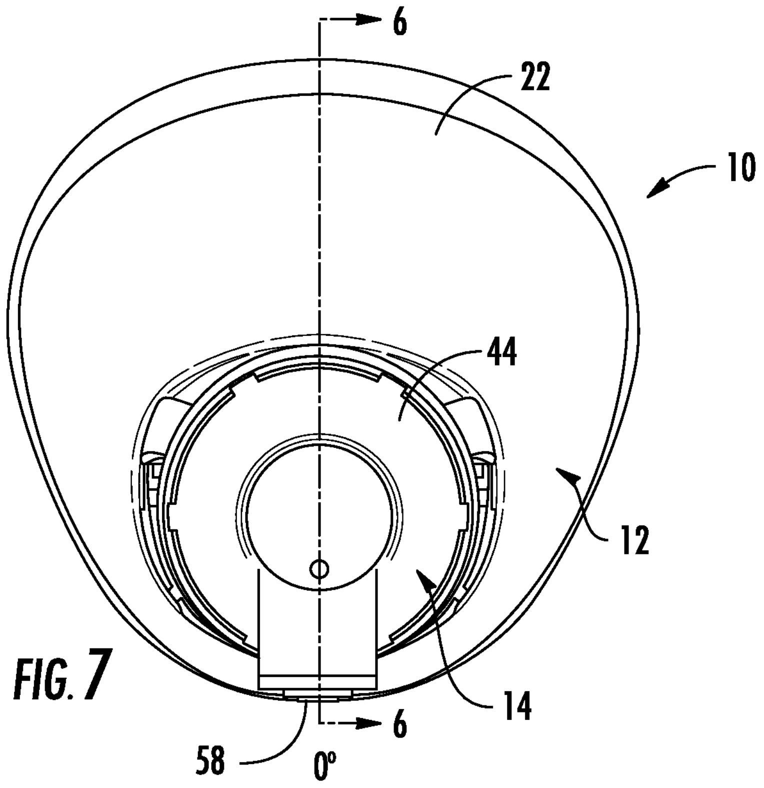
FIG. 7 shows a front view of the respirator mask, the regulator being in the first rotational position.
Figure 8:
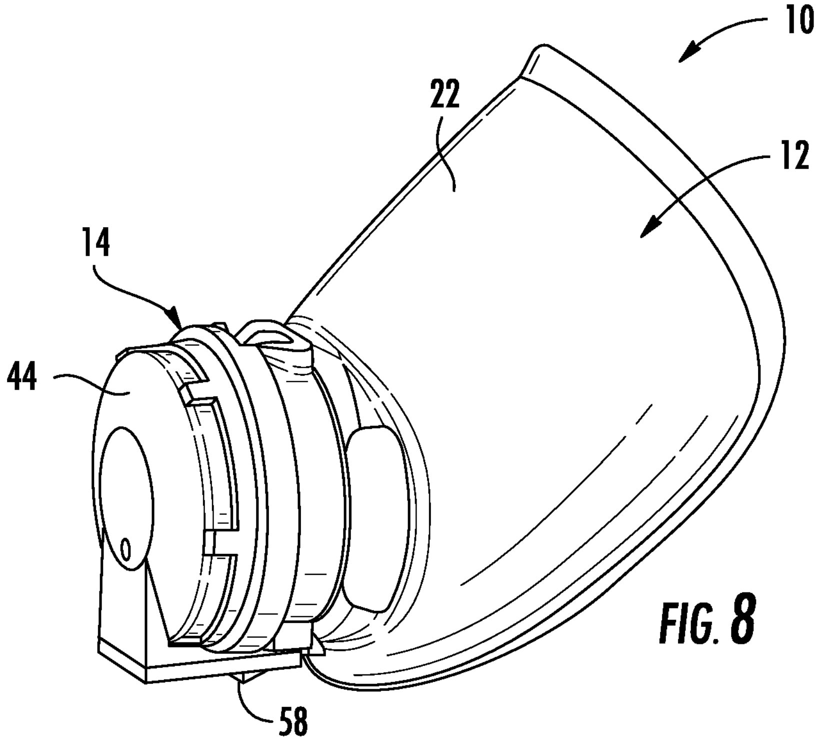
FIG. 8 shows a perspective view of the respirator mask, the regulator being in the first rotational position.

FIGS. 6-8 show the respirator mask 10 with the regulator 14 in the first or initial position referenced at 0°. This is the initial position for the regulator 14 as the regulator 14 is inserted into the facepiece aperture 16. In this position, the regulator 14 is oriented such that the manual actuator 58 is facing downward, relative to a user in an upright position. As shown in FIG. 6, the protrusion engagement element 62 is in contact with the facepiece 12 proximate the protrusion 28. The latch 34 is in a first position in which the manual actuator 58 is in a first or initial position relative to the aperture 60. Further, the second end 56 of the latch 34 is a distance from, or not in contact with, the lever 66. The air-saver switch is in an activated or "on" position in which the lever 66 is in a first or upright position and the diaphragm valve 70 is in a first position and the lever catch spring 80 is engaged with the notch 82 in the regulator body 40. Alternatively, it is contemplated that the air-saver switch is in a deactivated or "off" position in which the lever 66 and diaphragm valve 70 is in a second position, such as that shown in FIG. 11.

Figure 9:
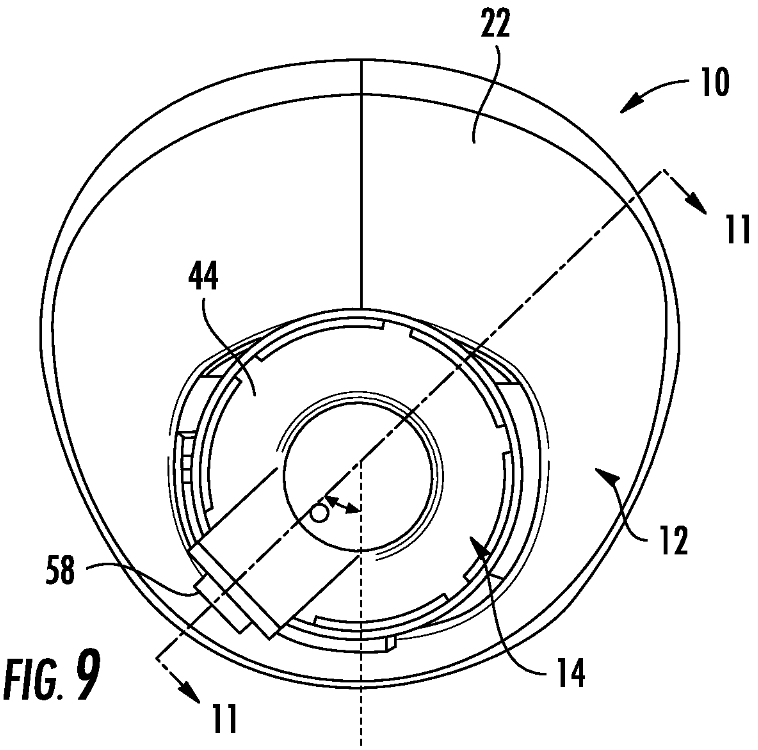
FIG. 9 shows a front view of the respirator mask, the regulator being in a second rotational position.
Figure 10:
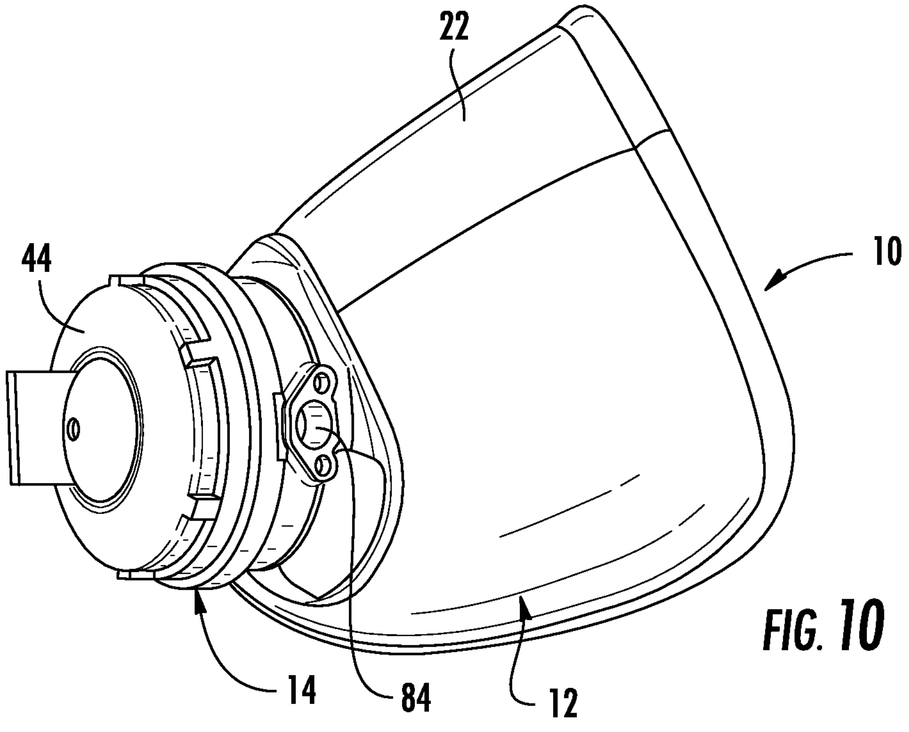
FIG. 10 shows a perspective view of the respirator mask, the regulator being in the second rotational position.
Figure 11:
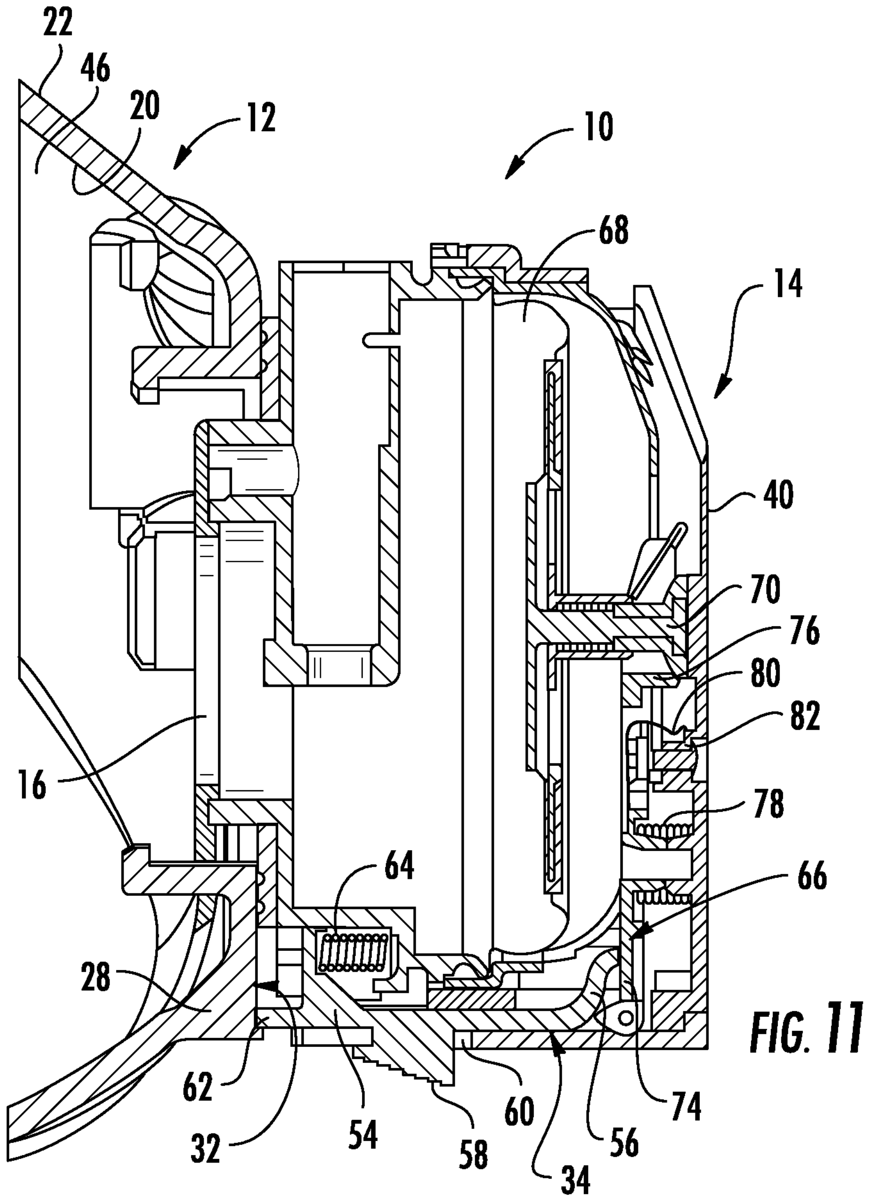
FIG. 11 shows a cross-sectional view of the regulator and a portion of the facepiece taken through section 11-11 of FIG. 9, the regulator being in the second rotational position.
Figure 12:
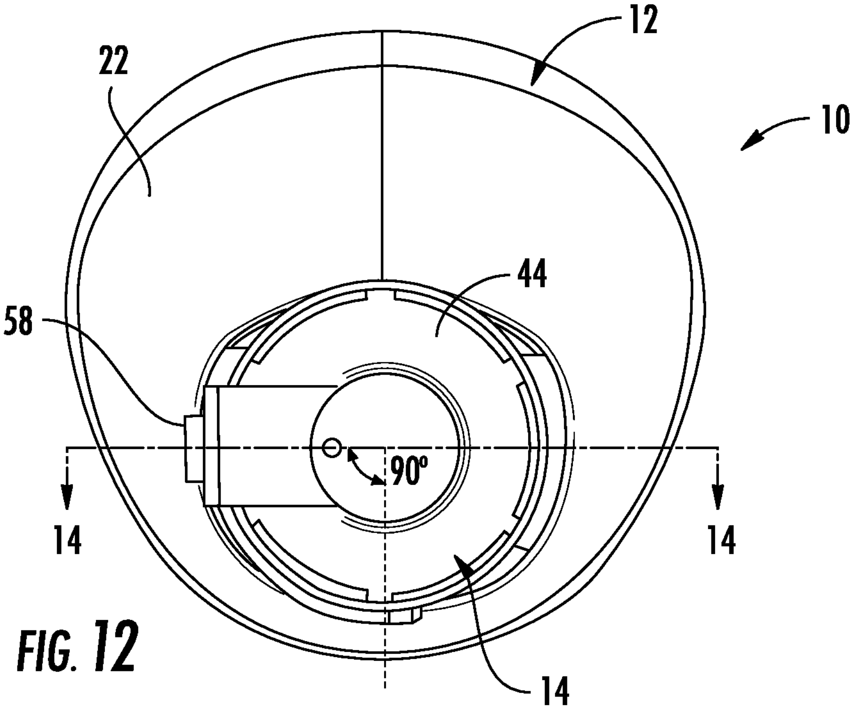
FIG. 12 shows a front view of the respirator mask, the regulator being in a third rotational position.
Figure 13:
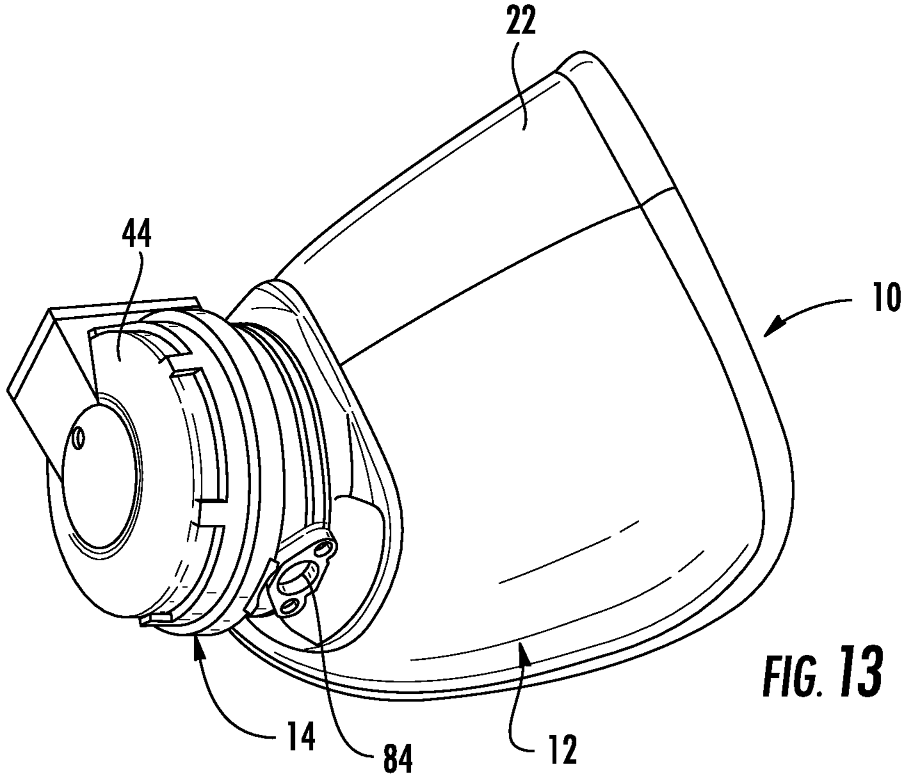
FIG. 13 shows a perspective view of the respirator mask, the regulator being in the third rotational position.

FIGS. 9-11 show the respirator mask 10 with the regulator 14 in an intermediate rotational position. As a non-limiting example, this location may be at substantially 45° (±10°) from the initial 0° position. However, it will be understood that the regulator 14 in the intermediate position may be at a location that is any number of rotational degrees from the initial or 0° position that allows the protrusion engagement element 62 to be in contact with, and be moved by, the protrusion apex 32. In other words, the intermediate position may alternatively be located at other rotational distances from the initial 0° rotational position. As the protrusion engagement element 62 moves along the protrusion toward the apex 32, the latch 34 is forced closer to, and may in fact be in contact with, the lever 66. When the protrusion engagement element 62 is in contact with the apex 32, maximum height of the protrusion 28, or decreased distance between the protrusion 28 and the regulator body 40, compresses the spring 64 a maximum amount and forces the latch 34 to a second position in which the manual actuator 58 is in a second or final position relative to the aperture 60. Further, the second end 56 of the latch 34 may not only be in contact with the lever 66, but may exert a force against the lever 66. If the air-saver switch was activated with the lever 66 in a first or upright position when the regulator was at the initial or 0° position, movement of the latch 34 against the lever 66 may not have any effect on the lever 66 and the air-saver switch may remain in the activated position. Conversely, if the air-saver switch was deactivated with the lever 66 in a second or canted position, the force exerted on the lever 66 by the latch 34 forces the lever 66 to the upright position, thereby engaging the air-saver switch.

FIGS. 12-15 show the respirator mask 10 with the regulator 14 in a third or locking position at a location that is a predetermined rotational distance from the initial 0° position. For example, in one embodiment the predetermined rotational distance may be substantially 90° (±10°) from the initial 0° position. During rotation of the regulator 14 from the second position to this third position, the protrusion engagement element 62 moves over the protrusion 28 and toward the locking slot 30 and the latch 34 moves back toward the first or initial position relative to the aperture 60. Once in the third position, the protrusion engagement element 62 fits into the locking slot 30 and the manual actuator 58 is in a first or initial position relative to the aperture 60. In this configuration, the regulator 14 is locked onto the facepiece 12. To remove the regulator 14, the user would have to move the manual actuator 58 toward the second or final position relative to the aperture 60 in order to disengage the protrusion engagement element 62 from the locking slot 30. The latch 34 is positioned such that the latch second end 56 is a distance away from and not in contact with the lever 66. The lever 66 remains in the upright position with the lever catch spring 80 being engaged with the regulator body notch 82 (as shown in FIG. 14).

In this third regulator position the diaphragm valve 70 remains in the first position until a vacuum force is exerted against the diaphragm 68. For example, this vacuum may be provided by the user's inhalation. As the latch 34 is in the first position and not in contact with the lever 66, the lever 66 and diaphragm valve 70 are free to move to the second position (shown in FIG. 15). In the second position, the diaphragm valve 70 may be moved closer to the facepiece 12 and toward the proximal end 42 of the regulator body 40 by the user's inhalation. Consequently, the lever 66 moves from the upright position to a canted position, extending the lever spring 78. This movement of the diaphragm valve 70 modulates the demand valve so that fluid such as compressed air travels through a port 84 in the regulator body 40 and into the mask 10 where it is available to the user when the user inhales. Put another way, the air-saver switch is disengaged or turned off by the user's first inhalation when the regulator 14 is in the third position at the 90° location.

Removal of the regulator 14 from the facepiece 12 automatically activates or turn on the air-saver switch without requiring the user to manually reset the air-saver switch to obstruct the fluid flow path, as is required in some currently known systems. To initiate rotation, the user slides the manual actuator 58 toward the second or final position relative to the aperture 60 to disengage the protrusion engagement element 62 from the locking slot 30. When the regulator 14 is then rotated from the third location back toward the 0° position, the protrusion engagement element 62 moves along the protrusion 28 toward the apex 32. At the apex 32, as discussed above, the latch 34 moves toward the distal end of the regulator 14 until the latch second end 56 is in contact with the lever 66. At this point, the lever 66 may still be in the second canted position. Further movement of the latch 34 toward the distal end of the regulator 14 forces the lever 66 to the initial or upright position, and the lever catch spring 80 again engages the notch 82. In this position, the air-saver switch is activated. The air-saver switch will remain activated as the regulator 14 is rotated the rest of the way to the 0° position and removed from the facepiece 12. Thus, movement of the protrusion engagement element 62 over the apex 32 of the protrusion 28 resets the air-saver switch.

The invention advantageously provides a respirator mask 10 for automatically activating an air-saver switch within a regulator 14 by rotation of the regular 14 as the regulator 14 is mounted and dismounted from a facepiece 12 of the respirator mask 10. In one embodiment, a respirator mask 10 includes a facepiece 12 including a regulator engagement region 24 having an aperture 16 and a protrusion 28 proximate the aperture 16, and a regulator 14 including a regulator body 40 having a facepiece engagement region 48 mateably engageable with the regulator engagement region 24, a fluid flow path within the regulator body 40, and a latch 34 within the regulator body 40, the latch 34 causing obstruction of the fluid flow path when actuated. At least a portion of the regulator 14 is sized and configured to be received within the facepiece aperture 16 such that the latch 34 is engageable with the protrusion 28, the regulator 14 being rotatable within the facepiece aperture 16 between a first rotational position and a second rotational position such that rotation of the regulator 14 within the facepiece aperture 16 from the second rotational position to the first rotational position engages and actuates the latch 34 to obstruct the fluid flow path (i.e., activate the air-saver switch).

In another aspect of this embodiment, the facepiece 12 further includes an interior surface 20 and an exterior surface 22 opposite the interior surface 20, and the protrusion 28 extends a distance from the facepiece exterior surface 22. The protrusion 28 includes an apex 32 at which the protrusion 28 extends a maximum distance from the facepiece exterior surface 22. The protrusion 28 is located at a third rotational position between the first rotational position and the second rotational position, the protrusion 28 includes a latch activation region 31, and the latch 34 is engaged and actuated by contact with the latch activation region 31 when the regulator 14 is rotated between the first rotational position and the second rotational position. The third rotational position may be substantially 45° from the first rotational position. The regulator 14 further includes a diaphragm 68 having a diaphragm valve 70, the diaphragm valve 70 being linearly movable within the regulator body 40. The facepiece 12 defines an interior 46 of the mask 10, an application of a vacuum on the diaphragm 68 from the interior 46 of the mask 10 moving the diaphragm valve 70 toward the facepiece 12 and unobstructing the fluid flow path (i.e., deactivating the air-saver switch). The regulator 14 further includes a lever 66 having a first end 74 and a second end 76 opposite the first end 74, the first end 74 being pivotably coupled to the regulator body 40 and the second end 76 being coupled to the diaphragm valve 70. The latch 34 is linearly movable within the regulator body 40. The latch 34 has a first end 54 and a second end 56 opposite the first end 54, the second end 56 being in contact with and exerting a force against the lever 66 when the first end 54 is in contact with the latch activation region 31. The latch 34 further has a protrusion engagement element 62 at the first end 54 and the facepiece engagement region 48 has an aperture 63, the protrusion engagement element 62 extending through the aperture 63. The regulator body 40 further has a proximal end 42 and a distal end 44 opposite the proximal end 42, the facepiece engagement region 48 being at the proximal end 42. The respirator engagement region 48 further has a locking slot 30. Further, the latch 34 is within the locking slot 30 when the regulator 14 is in the second rotational position.

A regulator 14 for a respirator mask 10 includes a regulator body 40 including a facepiece engagement region 48, a fluid flow path within the regulator body 40, a latch 34 movable within the regulator body 40, the latch 34 including a first end 54 having a protrusion engagement element 62 and a second end 56 opposite the first end 54, at least a portion of the protrusion engagement element 62 protruding from the facepiece engagement region 48, a diaphragm 68 having a diaphragm valve 70 linearly movable within the regulator body 40 such that the fluid flow path is obstructed when the diaphragm valve 70 is held at a first position and the fluid flow path is unobstructed when the diaphragm valve 70 allowed to move between the first position and the second position, and a lever 66 within the regulator body 40, the lever 66 including a first 74 end pivotably coupled to the regulator body 40 and a second end 76 coupled to the diaphragm valve 70, the latch second end 56 engaging and actuating the lever 66 to move the diaphragm valve 70 from the second position to the first position. The latch 34 is linearly movable along a first axis and the diaphragm valve 70 is linearly movable along a second axis. The latch 34 is movable along a linear distance having an initial location, a final location, and an intermediate location between the initial location and the final location, the latch 34 actuating the lever 66 when the latch 34 is at one of the intermediate location and the final location. The lever 66 includes a lever catch spring 80 that is configured to engage a portion of the regulator body 40 when the lever 66 is in a first position and disengage the portion of the regulator body 40 when the lever 66 is in a second position. Linear movement of the latch 34 toward the starting location and away from the lever 66 causes the lever catch spring 80 to disengage the portion of the regulator body 40 such that an application of a vacuum on the diaphragm 68 will move the diaphragm 68 to a position in which the fluid flow path is unobstructed.

A facepiece 12 for a respirator mask 10 includes a first surface 20, a second surface 22 opposite the first surface 20, an aperture 16 extending from the first surface 20 to the second surface 22, and a regulator engagement region 24 region including a protrusion 28 on the facepiece second surface 22 proximate the aperture 16, the protrusion 28 having a latch activation region 31 with a height relative to the facepiece second surface 22.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the scope of the embodiments will be apparent to those of skill in the art upon reviewing the above description. In the appended embodiments, the terms "including" and "in which" are used as the plain-English equivalents of the respective terms "comprising" and "wherein." Moreover, in the following embodiments, the terms "first," "second," and "third," etc. are used merely as labels, and are not intended to impose numerical requirements on their objects.

Different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the specification, including the drawings, shall be construed to constitute a complete written description of all combinations and subcombinations of the embodiments described herein, and of the manner and process of making and using them, and shall support embodiments to any such combination or subcombination.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the invention.

This application is a continuation of U.S. patent application Ser. No. 16/065,271 (published as U.S. Patent Application Publication No. 2021/0170206, and now allowed), which was a national stage filing under 35 U.S.C. 371 of PCT Application No. PCT/US2016/068340 (published as International Publication No. WO2017/116999), which claimed priority to U.S. Provisional Applications Nos. 62/272,821 and 62/376,203, the disclosures of all of which are incorporated by reference in their entirety herein.

What is claimed is:

1. A respirator mask comprising:

a facepiece including a regulator engagement region having:

an aperture; and a protrusion proximate the aperture;

wherein the facepiece further includes an interior surface and an exterior surface opposite the interior surface, the protrusion extending a distance from the facepiece exterior surface;

and, a regulator including:

a regulator body having a facepiece engagement region mateably engageable with the regulator engagement region;

a fluid flow path within the regulator body configured to receive pressurized air from a tank; and a latch within the regulator body, the latch configured to cause obstruction of the fluid flow path when actuated; and at least a portion of the regulator being sized and configured to be received within the facepiece aperture such that the latch is engageable with the protrusion, the regulator being rotatable within the facepiece aperture between a first rotational position that is an installed position and a second rotational position that is an uninstalled position, such that rotation of the regulator within the facepiece aperture from the second rotational position to the first rotational position engages the protrusion of the facepiece with a protrusion engagement element of the latch and actuates the latch to obstruct the fluid flow path.

2. The respirator mask of claim 1, wherein the protrusion of the facepiece includes an apex at which the protrusion extends a maximum distance from the facepiece exterior surface.

3. The respirator mask of claim 2, wherein the protrusion is in the form of an elongate ramp having an outward surface whose distance from the facepiece exterior surface varies along the elongate length of the ramp, this distance being a maximum at the apex of the ramp and decreasing toward first and second terminal ends of the elongate ramp.

4. The respirator mask of claim 1, wherein the protrusion of the facepiece is located at a third, intermediate rotational position between the first, installed rotational position and the second, uninstalled rotational position, the protrusion including a latch activation region.

5. The respirator mask of claim 4, wherein the actuating of the latch to obstruct the fluid flow path is configured to result from the latch activation region of the protrusion of the facepiece contacting the protrusion engagement element of the latch so that the latch is urged linearly away from an initial latch position as the regulator is rotated; and wherein the actuating of the latch to obstruct the fluid flow path is configured to occur when the regulator is rotated from the first, installed rotational position to the second, uninstalled rotational position as well as when the regulator is rotated from the second, uninstalled rotational position to the first, installed rotational position.

6. The respirator mask of claim 1, wherein the respirator engagement region of the facepiece further has a locking slot, and wherein the protrusion engagement element of the latch of the regulator is within the locking slot of the facepiece when the regulator is in the first, installed rotational position.

7. The respirator mask of claim 6, wherein the latch of the regulator resides in an initial latch position in the absence of the protrusion engagement element of the latch being engaged with the protrusion of the facepiece, wherein a biasing element biases the latch towards this initial latch position, and wherein when the regulator is in its first, installed rotational position so that the protrusion engagement element of the latch of the regulator is within the locking slot of the facepiece, the latch is urged by the biasing element to return to its initial latch position.

8. The respirator mask of claim 7, wherein with the regulator in its first, installed rotational position so that the protrusion engagement element of the latch of the regulator is within the locking slot of the facepiece and the latch is in its initial latch position, the fluid flow path is configured to remain obstructed until a first inhalation by a wearer of the respirator mask opens the fluid flow path so that the fluid flow path is no longer obstructed.

9. The respirator mask of claim 8, wherein with the regulator in its first, installed rotational position and with the fluid flow path having been opened by the first inhalation by the wearer of the respirator mask, rotation of the regulator from its first, installed rotational position through a third, intermediate rotational position to the second, uninstalled rotational position, engages the protrusion of the facepiece with the protrusion engagement element of the latch and actuates the latch to re-obstruct the fluid flow path.

10. The respirator mask of claim 1, wherein the regulator further includes a diaphragm having a diaphragm valve, the diaphragm valve being linearly movable along a diaphragm valve motion axis within the regulator body such that the fluid flow path is obstructed when the diaphragm valve is at a first diaphragm valve position and the fluid flow path is unobstructed when the diaphragm valve is at a second diaphragm valve position.

11. The respirator mask of claim 10, wherein the facepiece defines an interior of the respirator mask, and wherein an application of a vacuum on the diaphragm of the regulator from the interior of the respirator mask linearly moves the diaphragm valve along the diaphragm valve motion axis from the first diaphragm valve position to the second diaphragm valve position thus opening the fluid flow path so that it is not obstructed.

12. The respirator mask of claim 10, wherein the regulator includes a lever having a first end and a second end opposite the first end, the first end of the lever being pivotably coupled to the regulator body and the second end of the lever being coupled to the diaphragm valve, the latch and lever being configured so that as the latch is actuated so as to move away from an initial latch position, a second end of the latch contacts the lever and urges the lever to pivotally move from a second lever position to a first lever position thus moving the diaphragm valve from the second diaphragm valve position in which the fluid flow path is unobstructed to the first diaphragm valve position in which the fluid flow path is obstructed.

13. The respirator mask of claim 12, wherein the lever includes a lever catch spring that is configured to engage a portion of the regulator body when the lever is in the first lever position, so that the lever remains in its first lever position causing the diaphragm valve to remain in its first diaphragm valve position in which the fluid flow path is obstructed.

14. The respirator mask of claim 13, wherein linear movement of the latch toward the initial latch position and away from the lever is configured to allow the lever catch spring to disengage the portion of the regulator body such that an application of a vacuum on the diaphragm will move the diaphragm valve to the first diaphragm position in which the fluid flow path is unobstructed.

15. The respirator mask of claim 12, wherein a first end of the latch is generally opposite the second end of the latch and comprises the protrusion engagement element of the latch, wherein the latch resides in the initial latch position in the absence of the protrusion engagement element of the latch being engaged with the protrusion of the facepiece, wherein a biasing element biases the latch towards the initial latch position, and wherein when the regulator is in its first, installed rotational position so that the protrusion engagement element of the latch of the regulator is within a locking slot of the facepiece, the latch is urged by the biasing element back into its initial latch position.

16. The respirator mask of claim 15, wherein the latch is configured so that when the protrusion engagement element of the first end of the latch is in contact with a latch activation region of the protrusion of the facepiece so that the latch is away from the initial latch position, the second end of the latch contacts the lever and exerts a force on the lever so that the second end of the lever urges the diaphragm valve from the second diaphragm valve position in which the fluid flow path is unobstructed, to the first diaphragm valve position in which the fluid flow path is obstructed.

17. The respirator mask of claim 16, wherein when the regulator is in its first, installed rotational position and the latch has been urged by the biasing element back into its initial latch position, the second end of the latch is no longer in contact with the lever, so that there is a gap between the second end of the latch and the lever.

18. The respirator mask of claim 1, wherein the latch is linearly movable away from an initial latch position to actuate the latch to obstruct the fluid flow path, along a direction of motion that is substantially outward, away from the facepiece of the respirator mask.

19. The respirator mask of claim 18, wherein the direction of linear motion of the latch away from the initial latch position is perpendicular to a major plane of a diaphragm of the regulator.

* * * * *